UNITED STATES PATENT OFFICE.

CARL BAEDER, OF HOBOKEN, NEW JERSEY.

INSULATING-VARNISH.

1,149,171.     Specification of Letters Patent.     Patented Aug. 10, 1915.

No Drawing.     Application filed April 18, 1914. Serial No. 832,762.

*To all whom it may concern:*

Be it known that I, CARL BAEDER, a citizen of the United States of America, and a resident of Hoboken, Hudson county, State of New Jersey, have invented a certain new and useful Improvement in Insulating-Varnishes, of which the following is a specification.

This invention relates to insulating varnishes adapted for a variety of uses such as in connection with electrical work as an insulating covering or film and analogous uses; for use as an electrical insulator on the surface of wood, impregnated wood, fiber, fiber compositions, press board, pressed paper, asbestos, asbestos board, etc., and for preventing the absorption of moisture; upon the surface of metal objects where high insulating properties are desired; upon glass and porcelain for preventing surface leakage and moisture condensation. It finds special application in coating the ordinary fabric insulated electric conductors as well as the bare wires themselves and in coating poles or other supports for electric conductors. Owing to its flexible nature, when applied to wires the latter may be bent as desired without breaking or cracking the insulating material.

In the following I have described one way of practising my invention, the features thereof being more particularly pointed out hereinafter in the claims.

Broadly speaking my new insulating varnish comprises a prepared mixture of a suitable gummy substance, such as black asphaltum for example, sulfur, prepared oil in which rubber has been incorporated, thinners and a Japan drier. These various ingredients may be of various kinds and variously prepared and I shall set forth those ingredients and the method of preparing them which I have found by practice to be suitable for the purpose and capable of giving a good result. The gummy substance may comprise any suitable substance having a gummy, resinous or asphaltic base such as resin, Zanzibar resin, kauri (from Australia), Brazilian resin, hard resin, Egyptian black (an asphaltum), black asphaltum, and gilsonite, (a black gum having an asphaltum base). I prefer to use gilsonite or black asphaltum.

A suitable prepared oil may be made as follows: take 100 gallons of raw linseed oil; 25 pounds of any suitable rubber, preferably refined Pará rubber; 10 pounds of borate of manganese; 75 pounds of sugar of lead which has previously been calcined to drive out the water and repulverized, and 50 gallons of turpentine. The linseed oil should be brought to a boil and the rubber added thereto in such manner that it does not settle to the bottom of the kettle and burn. The boiling should be continued until all the rubber has been dissolved. The temperature of the liquid mass should then be raised to approximately 560° F. and held at that point, say within 10° either way, for a considerable length of time. I have found a period of 8 hours to give good results. The liquid mass should then be cooled to approximately 350° F. and the sugar of lead gradually added under stirring, the stirring being continued for a short time after the sugar of lead has been dissolved; the temperature of the mass should then be raised to approximately 450° F. and the borate of manganese added under stirring; after the borate of manganese has been dissolved or thoroughly incorporated with the mass the temperature should be raised to approximately 530° F. and held there for a considerable length of time. I have found 4½ hours to give good results. This last mentioned prolonged heating is to afford opportunity for a thorough mixing of all the ingredients. The liquid mass should now be allowed to cool to approximately 350° F. and the turpentine added under stirring until it is thoroughly mixed with the liquid mass. The prepared oil is now ready for use. As thinners I may use turpentine or turpentine substitutes, benzene or kerosene. I prefer to use turpentine.

A suitable Japan drier may be made as follows: take 12 pounds of soda ash; 150 pounds of rosin; 10 gallons of raw linseed oil; 25 pounds of sugar of lead; 25 pounds of black manganese, and 60 gallons of thinners. The soda ash should be dissolved in 4 gallons of water (three pounds of soda ash to one gallon of water) and the liquid heated gently under stirring until the water has evaporated; the soda ash should then be pulverized and the rosin added thereto; the mass should then be heated until thoroughly melted and should be stirred until the soda ash is all dissolved; the raw linseed oil is then added under heat, and the mass cooked under stirring until the ingredients are thoroughly mixed; the sugar of lead should then be gradually added and then the black manganese and the whole mass cooked until a stiff pasty mass results; the mass should then be allowed to cool to approximately 350° F. and the thinners should then be added and thoroughly mixed with the pasty mass. The Japan drier is then ready for use.

Now having prepared by prepared oil and my Japan drier I proceed as follows: I take, for example, 100 pounds of gilsonite; 5 pounds of sulfur; 5 gallons of prepared oil; 25 gallons of thinners and 2½ gallons of Japan drier. The gilsonite is placed in a suitable vessel and heated to approximately 300° F. and until it is thoroughly liquefied; the sulfur is then gradually added under stirring until the sulfur is thoroughly mixed with and dissolved in the liquefied resin, the temperature meanwhile having been gradually raised to approximately 350° F. The prepared oil is then added and the temperature is raised to approximately 450° F. and held at that temperature for some time, say for half an hour, the mixture being meanwhile subjected to stirring; the mixture is then permitted to cool to approximately 350-400° F. and the thinners then added and the mass stirred until thoroughly mixed, the mixture meanwhile being permitted to cool to approximately 250° F.; the Japan driers are then added under stirring and the varnish is ready for use.

The varnish is in the form of a rather thin liquid varnish. If too thick for use when applied it may be thinned by adding a little turpentine.

It is obvious that the order of steps in making my varnish and of adding the ingredients to each other, such as adding the sulfur to the prepared oil rather than directly to the liquefied resinous material, may be varied without departing from the spirit of my invention. It is further obvious from the foregoing description that the ingredients, the proportions thereof and the method of preparing my new varnish, may be greatly varied without departing from the spirit or essentials of my invention and I do not restrict myself to any of the details as described, further than the scope of the appended claims demand.

What I claim and desire to secure by Letters Patent is:—

1. The composition of matter containing a resinous base, linseed oil, rubber, sulfur, and an oxygen compound of manganese combined to yield on drying a residuum possessing low electrical conductivity, a high degree of flexibility and an exceedingly low degree of brittleness.

2. The composition of matter containing a resinous base, linseed oil, rubber, sugar of lead, sulfur and an oxygen compound of manganese combined to yield on drying a residuum possessing low electrical conductivity, a high degree of flexibility and an exceedingly low degree of brittleness.

3. The composition of matter containing a resinous base, linseed oil, rubber, sulfur and an oxygen compound of manganese, combined with a drier to yield on drying a residuum possessing low electrical conductivity, a high degree of flexibility and an exceedingly low degree of brittleness.

4. The composition of matter containing gilsonite, linseed oil, rubber, borate of manganese, sugar of lead and sulfur mixed with thinning and drying media to produce upon drying a residuum possessing low electrical conductivity, a high degree of flexibility and an exceedingly low degree of brittleness.

5. An insulating varnish comprising a resinous base and sulfur mixed with the following ingredients in approximately the proportions named; 100 gallons raw linseed oil; 25 pounds of refined Pará rubber; 10 pounds of borate of manganese; 75 pounds of calcined sugar of lead and 50 gallons of turpentine, a thinner and a Japan drier.

6. An insulating varnish comprising the following ingredients in approximately the proportions named; 100 pounds of a resinous base; 10 pounds of borate of manganese; 5 pounds of sulfur; 5 gallons of linseed oil combined with rubber; 25 gallons of thinners and 2½ gallons of a Japan drier.

7. An insulating varnish yielding a residuum possessing low electrical conductivity, a high degree of flexibility, an exceedingly low degree of brittleness composed of a resinous base, sulfur, linseed oil, rubber, borate of manganese and sugar of lead mixed with thinning and drying media.

In testimony whereof I have signed this specification in the presence of two subscribing witnesses.

CARL BAEDER.

Witnesses:
K. G. LE ARD,
S. M. BAEDER.